(12) United States Patent

Gürsu et al.

(10) Patent No.: US 12,672,042 B2

(45) Date of Patent: Jun. 30, 2026

(54) UPF BASED TRANSMISSION OF USER DATA FOR SELECTIVE ACTIVATION TO SELECTIVE ACTIVATION CANDIDATE NODES

(71) Applicant: Nokia Technologies Oy, Espoo (FI)

(72) Inventors: Halit Murat Gürsu, Munich (DE); Ahmad Awada, Munich (DE); Krzysztof Kordybach, Wroclaw (PL); Aritra Chatterjee, Bangalore (IN); Srinivasan Selvaganapathy, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 343 days.

(21) Appl. No.: 18/483,707

(22) Filed: Oct. 10, 2023

(65) Prior Publication Data

US 2024/0121683 A1 Apr. 11, 2024

(30) Foreign Application Priority Data

Oct. 10, 2022 (IN) .............................. 202241057915

(51) Int. Cl.
*H04W 36/08* (2009.01)
*H04L 1/1607* (2023.01)
*H04W 36/00* (2009.01)

(52) U.S. Cl.
CPC ........... *H04W 36/08* (2013.01); *H04L 1/1642* (2013.01); *H04W 36/00835* (2018.08)

(58) Field of Classification Search
CPC ............ H04W 36/08; H04W 36/00835; H04L 1/1642
See application file for complete search history.

(56) References Cited

FOREIGN PATENT DOCUMENTS

WO WO-2022021247 A1 * 2/2022 ............ H04W 36/30
WO WO-2022151306 A1 * 7/2022 .......... H04W 36/362

OTHER PUBLICATIONS

WO-2022021247-A1-Translated (Year: 2022).*
WO-2022151306-A1-Translated (Year: 2022).*
"3rd Generation Partnership Project; Technical Specification Group Radio Access Network; Evolved Universal Terrestrial Radio Access (E-UTRA) and NR; Multi-connectivity; Stage 2 (Release 17)", 3GPP TS 37.340, V17.1.0, Jun. 2022, pp. 1-112.
"Introduction of CPA and inter-SN CPC", 3GPP TSG-RAN WG2 Meeting #116-e, R2-2111640, CATT, Nov. 1-12, 2021, 34 pages.

(Continued)

*Primary Examiner* — Yemane Mesfin
*Assistant Examiner* — Jia Hao Deng
(74) *Attorney, Agent, or Firm* — Carter, DeLuca & Farrell LLP

(57) ABSTRACT

Described herein is a User Plane Function, UPF, network node, configured for data forwarding for selective activation of a Secondary Cell Group, SCG, for serving a User Equipment, UE, the UPF network node comprising:

at least one processor, and at least one memory storing instructions that, when executed by the at least one processor, cause the UPF network node at least to:

receive an indication message for starting data forwarding; and execute data forwarding on the basis of the received indication message.

15 Claims, 4 Drawing Sheets

(56) References Cited

OTHER PUBLICATIONS

"New WID on Further NR mobility enhancements", 3GPP TSG RAN Meeting #94e, RP-213565, Agenda Item: 8A.2, MediaTek, Dec. 6-17, 2021, 5 pages.

"3rd Generation Partnership Project; Technical Specification Group Radio Access Network; NG-RAN; NG Application Protocol (NGAP (Release 17)", 3GPP TS 38.413, V17.2.0, Sep. 2022, pp. 1-576.

"3rd Generation Partnership Project; Technical Specification Group Radio Access Network; NG-RAN; Xn application protocol (XnAP) (Release 17)", 3GPP TS 38.423, V17.2.0, Sep. 2022, pp. 1-614.

"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.

"3rd Generation Partnership Project; Technical Specification Group Radio Access Network; NR; NR and NG-RAN Overall Description; Stage 2 (Release 16)", 3GPP TS 38.300, V16.6.0, Jun. 2021, pp. 1-152.

"3rd Generation Partnership Project; Technical Specification Group Radio Access Network; NG-RAN; Architecture description (Release 16)", 3GPP TS 38.401, V16.6.0, Jul. 2021, pp. 1-79.

"3rd Generation Partnership Project; Technical Specification Group Radio Access Network; Study on new radio access technology: Radio access architecture and interfaces (Release 14)", 3GPP TR 38.801, V14.0.0, Mar. 2017, pp. 1-91.

"Node B (NodeB)", ITWissen.info, Retrieved on Nov. 6, 2023, Webpage available at : https://www.itwissen.info/en/node-B-NodeB-127577.html#gsc.tab=0.

"Source-node- and UPF-based data forwarding", 3GPP TSG-RAN WG3 Meeting #118, R3-226193, Agenda item: 14.4, Nokia, Nov. 14-18, 2022, 3 pages.

Extended European Search Report received for corresponding European Patent Application No. 23196498.2, dated Mar. 11, 2024,13 pages.

"3rd Generation Partnership Project; Technical Specification Group Radio Access Network; Evolved Universal Terrestrial Radio Access (E-UTRA) and NR; Multi connectivity; Stage 2 (Release 17)", 3GPP TS 37.340, V17.2.0, Sep. 2022, pp. 1-112.

* cited by examiner

UPF BASED TRANSMISSION OF USER DATA FOR SELECTIVE ACTIVATION TO SELECTIVE ACTIVATION CANDIDATE NODES

TECHNOLOGY

The present disclosure relates to Conditional PSCell addition/change to enable a UE to add/modify a Secondary Cell Group for dual connectivity purposes, and in particular to user data forwarding for selective activation of a Secondary Cell Group.

BACKGROUND

Any discussion of the background art throughout the specification should in no way be considered as an admission that such art is widely known or forms part of common general knowledge in the field.

Conditional PSCell Addition (CPA) and Conditional PSCell Change (CPC) are standardized in 3GPP Rel-16 and Rel-17 following a similar approach of Conditional HandOver (CHO) that is standardized in 3GPP Rel-16. The basic functionality of both these features is to enable a User Equipment, UE to add/modify a Secondary Cell Group (SCG) for dual connectivity purposes. The details on these procedures may be read from TS 37.340 and TS 38.331 for both Rel-16 and Rel-17.

In Rel. 16, CPC has been specified for intra-SN (intra-Secondary Node) scenario according to TS 37.340. Further, CPC has been extended in Rel. 17 for inter-SN (inter-Secondary Node) scenarios where it has two implementations: MN-initiated (Master Node-initiated) CPC and SN-initiated (Secondary Node-initiated) CPC according to 3GPP document R2-2111640. Either form shares a part of the procedure with CPA, i.e., the SN (Secondary Node) addition steps towards a target SN, wherein the target SN is a candidate SN selected from a plurality of candidate SNs for serving the UE. At the beginning of the common part of the procedures, the MN initiates the SN addition preparation procedures towards the target SN.

Therein, for selective activation of SCG, multiple candidate PSCells (Primary SCG Cells) are configured for potential PSCell change from the currently serving PSCell, in which the current Source SN is located or which the current Source SN controls, to a target PSCell which is a candidate PSCell selected from a plurality of candidate PSCells for serving the UE. The UE can switch between these PSCells quickly without any re-preparation or re-signaling. This however requires that configurations relating to the PSCells as well as their selection and activation are retained for a longer time.

For instance, for applications that require early data forwarding to provide low latency data access, the early data forwarding must be done towards all prepared candidate SNs. After each PSCell change execution, a candidate SN located in a candidate PSCell might become source SN and the source SN becomes a candidate SN. The information needed for the data flow must be updated, which is achieved by using a new set of Tunnel Endpoint Identities (TEIDs) identifying the data forwarding flows.

However, the TEIDs must be updated from the source SN to the candidate SNs (possibly via the MN) after each SN change. With selective activation of SCG, the serving cell might change often, which will cause unnecessary signaling towards MN even when the set of prepared cells remains the same.

To summarize, the above CPC procedures result in following issues: 1) Such frequent data forwarding switch among the same candidate SNs cause an unnecessary signaling burden; and 2) MN must continuously forward data from source SN to candidates SNs that are retained for a longer time. This means an increased Xn interface overhead.

Thus, there is a need to provide, for selective activation of SCG for dual connectivity purposes, a simplified data forwarding procedure with reduced signaling overheads, in particular considering frequent PSCell changes.

In the following, "CPC" and "PSCell change" are used interchangeably.

SUMMARY

Object of the present disclosure is to provide a UPF network node (User Plane Function network node), a Source MN (Source Master Node), a Source SN (Source Secondary Node) and a Target SN (Target Secondary Node), which are configured for achieving a simplified data forwarding procedure with reduced signaling overheads in particular in CPC procedures.

Object of the present disclosure is also to provide a system comprising the UPF network node, the Source MN, the Source SN and the Target SN, which is configured for achieving a simplified data forwarding procedure with reduced signaling overheads in particular in CPC procedures.

Object of the present disclosure is also to provide methods carried out respectively by the UPF network node, the Source MN, the Source SN and the Target SN, as well as the above system, for achieving a simplified data forwarding procedure with reduced signaling overheads in particular in CPC procedures.

In accordance with an aspect of the present disclosure, there is provided a User Plane Function, UPF, network node, configured for data forwarding for selective activation of a Secondary Cell Group, SCG, for serving a User Equipment, UE, the UPF network node comprising: at least one processor, and at least one memory storing instructions that, when executed by the at least one processor, cause the UPF network node at least to: receive an indication message for starting data forwarding; and execute data forwarding on the basis of the received indication message.

Therein, with UPF network node, it is preferably referred to a network element or a network node that is configured for instance in the core network for carrying out the user plane network functions.

Therein, with data forwarding, it is preferably referred to forwarding of user data, including for instance data for the UE that is received via eNodeB (E-UTRAN Node B) and/or gNodeB (Next-Generation NodeB).

Therein, preferably the UPF network node is configured to, or is caused to receive the indication message from a Source MN (Source Master Node), possibly via an AMF network node (Access and Mobility Management Function network node). Additionally or alternatively, the UPF network node is configured to receive the indication message from a Source SN (Source Secondary Node).

According to the present disclosure, the UPF network node is configured to directly receive an indication message for indicating to start forwarding of user data. Hence, data forwarding is executed directly upon receiving the indication message, meeting in particular requirements of applications on UE, i.e., on the user side, which require low latency. In particular, the data forwarding procedure is simplified by configuring the UPF network node to directly start data forwarding upon receiving the indication message.

In some examples, the indication message indicates, for selective activation of a Target Primary SCG Cell, that is, Target PSCell, for serving the UE, a candidate list comprising Candidate PSCells and Candidate Secondary Nodes, that is, Candidate SNs, wherein the indication message further indicates a Source Secondary Node, that is, Source SN, and the UPF network node is further caused to: execute data forwarding directly towards the Candidate SNs and the Source SN.

Therein, with Secondary Node, it is preferably referred to a network node, for instance, a gNodeB that is configured to control a PSCell (Primary SCG Cell) of a SCG (Secondary Cell Group), wherein SCG and MCG (Master Cell Group) together provide dual connectivity for a user device which is connected to both SCG and MCG. Therein, SCG and analogously MCG preferably both comprise multiple cells. A Primary Cell in MCG is preferably controlled by a Master Node, for instance, an eNodeB.

Therein, with Source SN, it is preferably referred to an SN that is currently serving the UE by controlling a corresponding PSCell, i.e., the SN that is serving the UE before a next change to a new serving PSCell is carried out.

Therein, the candidate list indicates preferably IDs of the Candidate PSCells and IDs of the Candidate SNs. Implementation details for configuring the Cell/SN IDs are not limited by this disclosure. The candidate PSCells and SNs preferably refer to PSCells and SNs that are suitable for serving the UE in addition to Primary Cells and MNs (Master Nodes) in MCG for dual connectivity.

With a PSCell change being executed, the currently serving SN becomes a candidate SN, whereas a Candidate SN is selected from the candidate list and activated as the new serving SN. Therefore, the candidate list comprising all Candidate SNs and the currently serving Source SN together constitute a group of SNs that are suitable for serving the UE in dual connectivity. Of course, the candidate list is updated each time after a PSCell change and/or addition.

From the candidate list, a Candidate SN is selected as the Target SN for replacing the currently serving SN. Therefore, with Target SN, it is referred to a newly selected SN to serve the UE in the currently serving Source SN's stead. Of course, there can be more than one SNs that are suitable for being selected from the candidate list, namely that there can be one or more Target SNs. This is not limited by this disclosure.

According to the present disclosure, the UPF network node is configured to directly forward user data to all SNs, including the Source SN that is currently serving the UE (possibly a newly selected Target SN) and all Candidate SNs. Therefore, all SNs directly receive the user data from the UPF network node, without the Source SN having to act as an intermediate node for forwarding the data to MN which further forwards the data to the remaining SNs other than the Source SN. Consequently, latency in data forwarding is furthermore reduced.

In some examples, the indication message indicates, for each SN of the candidate list, a Protocol Data Unit, PDU, session related to the each SN.

Therein, preferably the PDU session is indicated by a PDU session ID. Implementation details for configuring an ID for a corresponding PDU session is not limited by this disclosure. For instance, the PDU session ID is configured in the GTP (GPRS Tunnelling Protocol) header, more specifically in the GTP-U (GTP User data tunneling) header.

Therefore, it is indicated, for each SN, the corresponding PDU session established for forwarding the user data to the each SN. As a result, the UPF network node is informed of the PDU sessions for the respective SNs for forwarding the user data.

Therein, preferably, the PDU session for an SN is indicated by a Tunnel Endpoint Identity, TEID, of a GTP tunnel established for transmitting the PDU session packets related to the SN. Preferably, there are a plurality of TEIDs available for the same PDU session among multiple RAN nodes (Radio Access Network nodes).

Therein, a TEID for a PDU session is preferably indicated in the GTP-U header. However, implementation details as to configuration of one or more TEIDs for a PDU session is not limited by this disclosure.

According to the present disclosure, the UPF network node directly forwards the user data to the SNs using the corresponding PDU sessions, leading to improved efficiency in data forwarding. In particular, neither the Source MN nor the Source SN needs to act as an intermediate node for relaying the data from the UPF to the remaining prepared Candidate SNs. As a result, signaling overhead is also reduced.

In some examples, the UPF network node is caused to execute data forwarding before the UE moves to a Candidate PSCell that is selected from the candidate list as the Target PSCell.

Therein, before a PSCell change is executed, preferably depending on latency requirements of application on the UE side, it is preferred to carry out early data forwarding, that is, forwarding of user data prior to a PSCell change.

For instance, after the Source MN or the Source SN initiates an SN change, and yet before CPC is executed, the UPF network node executes early data forwarding towards for instance all SNs.

According to the present disclosure, the UPF network node executes early data forwarding, i.e., data forwarding before PSCell change is executed by the UE, such that latency requirements can be met.

In some examples, the UPF network node is caused to transmit a confirmation message for starting data forwarding, wherein the confirmation message preferably comprises, for each SN of the candidate list, a Tunnel Endpoint Identity, TEID, of a GPRS Tunnelling Protocol, GTP, tunnel established for transmitting Protocol Data Unit, PDU, session packets related to the each SN.

Therein, the UPF network node is caused to transmit the confirmation message preferably to the Source MN, possibly via an AMF network node. Additionally or alternatively, the UPF network node is caused to transmit the confirmation message to the Source SN. This preferably depends on whether the Source MN or the Source SN sends the indication message to the UPF network node.

Preferably, the UPF network node is configured to provide a flag information in the confirmation message indicating whether early data forwarding has been started or executed. Implementation details for configuring the flag information is limited by this disclosure. For instance, a flag bit of "0" or "1" is added to the confirmation message.

According to the present disclosure, the UPF network node provides a confirmation to the sending entity providing the indication message, confirming reception of the indication message for starting data forwarding.

In some examples, the UPF network node is caused to execute data forwarding after the UE moves to a Candidate PSCell that is selected from the candidate list as the Target PSCell.

In addition or alternatively to the early data forwarding, i.e., forwarding of user data before UE executes CPC configurations, it is preferable that the UPF network node further executes late data forwarding, i.e., forwarding of user data after the UE executes CPC configurations, that is, after the UE moves to the Target PSCell, namely a newly selected and activated Candidate SN as the new SN to serve the UE.

According to the present disclosure, after CPC execution, the UPF network node is likewise configured to forward the user data directly to all SNs, leading to reduced latency and signaling overhead as no intermediate node is necessary for relaying the data between the UPF network node, the SNs and the MN.

In accordance with an aspect of the present disclosure, there is provided a Source Master Node, Source MN, configured for data forwarding for selective activation of a Secondary Cell Group, SCG, for serving a User Equipment, UE, the Source MN node comprising: at least one processor, and at least one memory storing instructions that, when executed by the at least one processor, cause the Source MN at least to: transmit, to a User Plane Function, UPF, network node, an indication message for starting data forwarding.

Therein, with Source MN, it is preferably referred to a network element or a network node that is configured for instance in the core network for controlling a corresponding Primary Cell in MCG for providing network access to the UE. MCG, of which a Primary Cell is controlled by the Source MN, and SCG, of which a Primary SCG Cell is controlled by a Source SN, provide dual connectivity to the UE.

According to the present disclosure, the Source MN is configured to transmit the indication message directly to the UPF network node, so as to indicate to start forwarding of user data. Therefore, the UPF network node is directly indicated to start forwarding the user data, meeting in particular requirements of applications on UE, i.e., on the user side, which require low latency. In particular, the data forwarding procedure is simplified by providing the UPF network node with the indication message.

In some examples, the indication message indicates, for selective activation of a Target Primary SCG Cell, that is, Target PSCell, for serving the UE, a candidate list comprising Candidate PSCells and Candidate Secondary Nodes, that is, Candidate SNs, wherein the indication message further indicates a Source Secondary Node, that is, Source SN, and the UPF network node is further caused to: execute data forwarding directly towards the Candidate SNs and the Source SN.

In some examples, the indication message indicates, for each SN of the candidate list, a Protocol Data Unit, PDU, session related to the each SN.

The implementations as to the above examples relating to the indication message as well as their advantages are mentioned above in regards to the UPF network node in greater detail, which therefore is not repeated here.

Preferably, the Source MN is further caused to: after UE executes selective activation of the Target PSCell, which is a Candidate PSCell selected from the candidate list, transmit an SN (secondary node) release request message to the Source SN, i.e., the currently serving SN, the SN release request message indicating that the UE is moving to the Target PSCell, i.e., the newly selected Candidate PSCell as the new serving PSCell.

Therein, that the UE is moving to the Target PSCell is preferably indicated by the Source MN receiving from the UE a RRC (Radio Resource Control) reconfiguration complete message, which indicates that CPC configurations have been executed by the UE.

In some examples, the Source MN is further caused to: transmit a Sequence Number Status message to a Candidate SN that is selected from the candidate list as the Target SN for serving the UE, the Sequence Number Status message indicating a last sequence number of the last Protocol Data Unit, PDU session packet sent towards the UE before the UE moves to the Target PSCell.

Therein, a sequence number of a particular data packet is preferably indicated in the GTP-U header. However, implementation details as to configuration of the packet sequence number is not limited by this disclosure.

Therein, preferably the Source MN is configured to obtain the Sequence Number Status message from the Source SN that is currently serving the UE since the currently serving SN is aware of the sequence numbers of the PDU packets sent to the UE. After receiving for instance the SN release request message, the Source SN is informed that the UE is moving to another PSCell.

Therein, the last sequence number of the last PDU session packet sent towards the UE before the UE moves to the Target PSCell is also referred to as "the last sequence number" in the following. Preferably, the last sequence number refers to a sequence number of a PDU session packet that is sent towards the UE at the time when the Source SN still serves the UE, i.e., the indicated PSCell changes has not yet taken place. This is for instance the last PDU session packet sent towards the UE at the time when the Source SN receives the SN release request. Additionally or alternatively, whether CPC is executed is indicated by completion of for instance a random access procedure between the UE and the Target SN, i.e., the newly selected SN for serving the UE.

Implementation details as to a specific point of time for determining the last sequence number is not limited by this disclosure. As will become evident later in this disclosure, the Target SN would continue to carry out data forwarding of any packets that follow the last sequence number.

Therein, the last sequence number of the last PDU session packet sent towards the UE at any point in time is also referred to as "the last sequence number" in the following. Preferably, the last sequence number refers to a sequence number of a PDU session packet that is sent towards the UE at any time. This option is used to indicate to Target and/or Candidate SNs, which packets they can delete from their buffers as UE has already received these data.

According to this disclosure, the Source MN is configured to inform the Target SN of the last sequence number of the packet sent towards the UE at the time of the currently serving Source SN still serving the UE. Therefore, data flow is continued without a loss of user data which would otherwise occur during switching the SN for serving the UE. Stability and reliability of the network access for the UE is ensured.

In some examples, the Sequence Number Status message comprises a Tunnel Endpoint Identity, TEID, of a GPRS Tunneling Protocol, GTP, tunnel established for a corresponding PDU session, for which the last PDU Session packet with the last sequence number is received, and the Source MN is further caused to: map the TEID of the GTP tunnel for the corresponding PDU session to a TEID of the Target SN.

Therein, as mentioned above, the Source MN is preferably configured to obtain the Sequence Number Status message from the Source SN that is currently still serving the UE before the Target SN starts to serve the UE.

Therein, in addition to providing the Target SN with the last sequence number of the last forwarded PDU packet, the Source MN is further configured to provide the TEID of the corresponding PDU session established for forwarding the last PDU session packet with the lash sequence number, such that the Target SN is indicated of the corresponding PDU session.

Preferably, the Source MN is configured to determine the TEID to indicate to the Target SN using a list of TEIDs for the same PDU session among a plurality of RAN nodes.

Therein, the Source SN indicates the GTP sequence number to the Source MN along with the TEID of the related GTP session to the Source MN. Upon reception of this information, the Source MN can send the Sequence Number Status Transfer message to other prepared Target SNs to indicate the sequence number of the next packet they shall communicate in DL (Downlink) to the UE. The Source MN is aware of the TEIDs from the UPF network node towards all SNs, including the Source SN and all Candidate SNs. The Source MN uses this mapping to indicate the PDU session specific GTP sequence number using the related TEID towards each target SN so the target SNs are aware of which packet they have to start transmitting once the UE arrives.

According to this disclosure, the Source MN is configured to accurately provide the Target SN, that is, the SN that is selected for serving the UE, with the sequence number of the last PDU packet that is forwarded to the UE during the currently serving Source SN's serving the UE, as well as to provide the corresponding PDU session, preferably identified by a TEID. As a result, the Target SN is informed as for which PDU session the PDU packets are to be continued to be forwarded. Stability and reliability of the network access for the UE is ensured.

In some examples, the Source MN is caused to transmit the indication message for starting data forwarding to the UPF network node via an Access and Mobility Management Function, AMF, network node.

In some examples, the Source MN is further caused to: before sending the indication message and on the basis of latency requirements of the UE, determine that data forwarding is to be carried out.

According to this disclosure, the specific latency requirements of the applications on the user side are taken into consideration. As a result, it can be determined that for instance early data forwarding is to be carried out before the UE moves to another PSCell for serving the UE.

In accordance with an aspect of the present disclosure, there is provided a Source Secondary Node, Source SN, configured for data forwarding for selective activation of a Secondary Cell Group, SCG, for serving a User Equipment, UE, the Source SN comprising: at least one processor, and at least one memory storing instructions that, when executed by the at least one processor, cause the Source SN at least to: transmit, to a User Plane Function, UPF, network element, an indication message for starting data forwarding.

Therein, with Source SN, it is preferably referred to a network element or a network node that is configured for instance in the core network for controlling a corresponding Primary SCG Cell in SCG for providing network access to the UE. SCG, of which a Primary SCG Cell (PSCell) is controlled by the Source SN, and MCG, of which a Primary Cell is controlled by the Source MN provide dual connectivity to the UE.

According to the present disclosure, the Source SN is configured to transmit the indication message directly to the UPF network node, so as to indicate to start forwarding of user data. Therefore, the UPF network node is directly indicated to start forwarding the user data, meeting in particular requirements of applications on UE, i.e., on the user side, which require low latency. In particular, the data forwarding procedure is simplified by providing the UPF network node with the indication message.

In some examples, the indication message indicates, for selective activation of a Target Primary SCG Cell, that is, Target PSCell, for serving the UE, a candidate list comprising Candidate PSCells and Candidate Secondary Nodes, that is, Candidate SNs, wherein the indication message further indicates a Source Secondary Node, that is, Source SN, and the UPF network node is further caused to: execute data forwarding directly towards the Candidate SNs and the Source SN.

In some examples, the indication message indicates, for each SN of the candidate list, a Protocol Data Unit, PDU, session related to the each SN.

The implementations as to the above examples relating to the indication message as well as their advantages are mentioned above in regards to the UPF network node in greater detail, which therefore is not repeated here.

Preferably, the Source SN is further caused to: receive an SN modification request message from the Source MN. Preferably, the SN modification request message comprises TEIDs of PDU sessions respectively established for all candidate SNs.

Preferably, the Source SN is configured to indicate the TEIDs of PDU sessions respectively established for all candidate SNs in the indication message transmitted to the UPF network node, such that the Source SN informs the UPF network node, for each SN, the related PDU session.

Preferably, the Source SN is further caused to: transmit to the Source MN an SN modification request acknowledgement message, indicating that data forwarding has been started towards the TEIDs indicated with the SN modification request message from the Source MN.

Preferably, the Source SN is further caused to: receive an SN (secondary node) release request message from the Source MN, the SN release request message indicating that the UE is moving from the currently serving PSCell to the Target PSCell, i.e., the newly selected Candidate PSCell as the new serving PSCell.

Preferably, the Source SN is further caused to: transmit, to the Source MN, an SN release request acknowledgement message.

In some examples, the Source SN is further caused to: transmit, to the Source MN, a Sequence Number Status message indicating a last sequence number of the last Protocol Data Unit, PDU session packet sent towards the UE before the UE moves to the Target PSCell.

The implementations as to the above examples relating to the Sequence Number Status message and the last sequence number of the last PDU session packet as well as their advantages are mentioned above in regards to the Source MN in greater detail, which therefore is not repeated here.

In some examples, the Source SN is further caused to: before sending the indication message and on the basis of latency requirements of the UE, determine that data forwarding is to be carried out.

According to this disclosure, the specific latency requirements of the applications on the user side are taken into consideration. As a result, it can be determined that for instance early data forwarding is to be carried out before the UE moves to another PSCell for serving the UE.

In accordance with an aspect of the present disclosure, there is provided a Target Secondary Node, Target SN, configured for data forwarding for selective activation of a Secondary Cell Group, SCG, for serving a User Equipment, UE, the Target SN comprising: at least one processor, and at least one memory storing instructions that, when executed by the at least one processor, cause the Target SN at least to: receive data forwarded directly from a User Plane Function, UPF, network node.

Therein, with Target SN, it is preferably referred to a network element or a network node that is configured for instance in the core network for controlling a corresponding Primary SCG Cell in SCG for providing network access to the UE. SCG, of which a Primary SCG Cell (PSCell) is controlled by the Target SN, and MCG, of which a Primary Cell is controlled by the Source MN provide dual connectivity to the UE.

According to this disclosure, the Target SN directly receives user data from for instance a UPF (User Plane Function) network node, such that the Target SN does not receive the user data indirectly from for instance the Source MN. Therefore, latency in forwarding of user data is reduced. Consequently, the Target SN can more efficiently forward the user data to the UE which requires a low latency.

In some examples, the Target SN is indicated in a candidate list comprising Candidate Primary SCG Cells, that is, Candidate PSCells, and Candidate Secondary Nodes, that is, Candidate SNs, wherein the Target SN is a Candidate SN selected from the candidate list for serving the UE.

Preferably, the Target SN is further caused to: receive, from a Source Master Node, Source MN, an SN reconfiguration complete message indicating that, at the time of the UE moving from the currently serving PSCell to a Target PSCell, a configuration (i.e., a reconfiguration) of the Target SN for serving the UE is completed.

In some examples, the Target SN is further caused to: receive, from the Source MN, a Sequence Number Status message indicating a last sequence number of the last Protocol Data Unit, PDU session packet sent towards the UE before the UE moves to the Target PSCell.

The implementations as to the above examples relating to Sequence Number Status message and the last sequence number of the last PDU session packet as well as their advantages are mentioned above in regards to the Source MN and the Source SN in greater detail, which therefore is not repeated here.

In some examples, the Target SN is further caused to: discard all PDU session packets with sequence numbers that are smaller than the last sequence number; and forward, to the UE, PDU Session packets with sequence numbers that are greater than the last sequence number.

As the Target SN is selected to serve the UE, as explained above, the Source SN serving the UE before the UE moves to a selected Candidate PSCell, i.e., a Target PSCell controlled by the Target SN, becomes the previously serving SN, whereas the Target SN becomes the serving SN. It is thus necessary to ensure that the Target SN continues with the data flow that is previously carried out, i.e., forwarded via the previously serving Source SN towards the UE.

In view of this, preferably the Target SN obtains, from the Sequence Number Status message, the TEID identifying the related PDU session with which the last packet with the last sequence number is forwarded to the UE at the time of the previous Source SN was serving the UE. Thereby, the Target SN is informed of the PDU session for receiving packets that follow the last sequence number.

According to this disclosure, the data flow to the UE is continued with a loss of any packets even in cases of frequent switching of the serving SN.

In accordance with an aspect of the present disclosure, there is provided a system, comprising: a User Plane Function, UPF, network node according to any one of the above examples or preferred implementations; a Source Master Node, Source MN, according to any one of the above examples or preferred implementations; a Source Secondary Node, Source SN, according to any one of the above examples or preferred implementations; at least one Target Secondary Node, Target SN, according to any one of the above examples or preferred implementations; and a user equipment, UE, served by a Primary Cell in a Secondary Cell Group, PSCell controlled by the Source SN or the at least one Target SN.

Preferably, the system further comprise an AMF network node (Access and Mobility Management Function network node) according to any one of the above examples or preferred implementations.

In accordance with an aspect of the present disclosure, there is provided methods respectively carried out by: a User Plane Function, UPF, network node, according to any one of the above examples or preferred implementations; a Source Master Node, Source MN, according to any one of the above examples or preferred implementations; a Source Secondary Node, Source SN, according to any one of the above examples or preferred implementations; at least one Target Secondary Node, Target SN, according to any one of the above examples or preferred implementations; and a system, according to any one of the above examples or preferred implementations.

In accordance with an aspect of the present disclosure, there is provided a computer program comprising instructions for causing an apparatus to perform any of the above methods, and a memory storing computer readable instructions for causing an apparatus to perform any of the above methods.

In addition, according to some other example embodiments, there is provided, for example, a computer program product for a wireless communication device comprising at least one processor, including software code portions for performing the respective steps disclosed in the present disclosure, when said product is run on the device. The computer program product may include a computer-readable medium on which said software code portions are stored. Furthermore, the computer program product may be directly loadable into the internal memory of the computer and/or transmittable via a network by means of at least one of upload, download and push procedures.

To summarize, it is provided according to this disclosure an apparatus/method for selective activation of SCG for dual connectivity in particular in a scenario of CPC/CPA, wherein the UPF network node directly receives the necessary information for forwarding user data to all Candidate SNs, and directly forwards the user data to the Candidate SNs. As a result, in case the serving SN changes frequently, unnecessary signaling can be avoided and latency is reduced.

While some example embodiments will be described herein with particular reference to the above application, it will be appreciated that the present disclosure is not limited to such a field of use, and is applicable in broader contexts.

Notably, it is understood that methods according to the present disclosure relate to methods of operating the apparatuses according to the above example embodiments and variations thereof, and that respective statements made with regard to the apparatuses likewise apply to the corresponding methods, and vice versa, such that similar description may be omitted for the sake of conciseness. In addition, the above aspects may be combined in many ways, even if not explicitly disclosed. The skilled person will understand that these combinations of aspects and features/steps are possible unless it creates a contradiction which is explicitly excluded.

Implementations of the disclosed apparatuses may include using, but not limited to, one or more processor, one or more application specific integrated circuit (ASIC) and/or one or more field programmable gate array (FPGA). Implementations of the apparatus may also include using other conventional and/or customized hardware such as software programmable processors, such as graphics processing unit (GPU) processors.

Other and further example embodiments of the present disclosure will become apparent during the course of the following discussion and by reference to the accompanying drawings.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Figure 1:
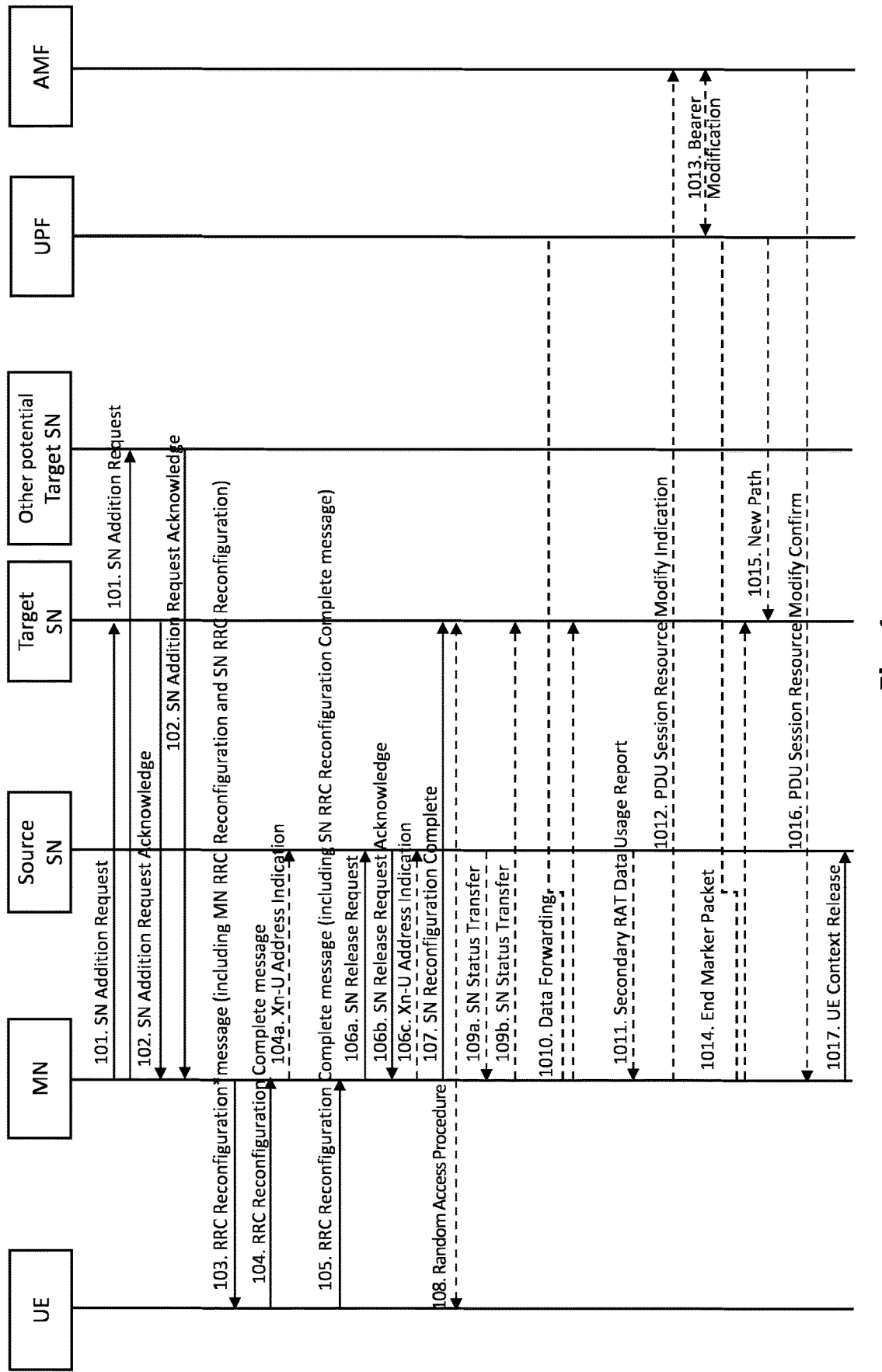
FIG. 1 schematically illustrates an example of a signaling/messaging flowchart for MN-initiated inter-SN Conditional Primary SCG Cell Change according to 3GPP TS 37.340.

In the following, different exemplifying embodiments will be described using, as an example of a communication network to which examples of embodiments may be applied, a communication network architecture based on 3GPP standards for a communication network, such as a 5G/NR, without restricting the embodiments to such an architecture, however. It is apparent for a person skilled in the art that the embodiments may also be applied to other kinds of communication networks where mobile communication principles are integrated with a D2D (device-to-device) or V2X (vehicle to everything) configuration, such as SL (side link), e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the disclosure can be extended and applied to any other type of communication network, such as a wired communication network.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules, etc., that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed unit (DU) or a centralized/central unit (CU), which controls a respective coverage area or cell(s) and with which one or more communication stations such as communication elements or functions, like user devices or terminal devices, like a user equipment (UE), or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The following description may provide further details of alternatives, modifications and variances: a gNB comprises e.g., a node providing NR user plane and control plane protocol terminations towards the UE, and connected via the NG interface to the 5GC, e.g., according to 3GPP TS 38.300 V16.6.0 (2021 June) section 3.2 incorporated by reference.

A gNB Central Unit (gNB-CU) comprises e.g., a logical node hosting e.g., RRC, SDAP and PDCP protocols of the gNB or RRC and PDCP protocols of the en-gNB that controls the operation of one or more gNB-DUs. The gNB-CU terminates the F1 interface connected with the gNB-DU.

A gNB Distributed Unit (gNB-DU) comprises e.g., a logical node hosting e.g., RLC, MAC and PHY layers of the gNB or en-gNB, and its operation is partly controlled by the gNB-CU. One gNB-DU supports one or multiple cells. One cell is supported by only one gNB-DU. The gNB-DU terminates the F1 interface connected with the gNB-CU.

A gNB-CU-Control Plane (gNB-CU-CP) comprises e.g., a logical node hosting e.g., the RRC and the control plane part of the PDCP protocol of the gNB-CU for an en-gNB or a gNB. The gNB-CU-CP terminates the E1 interface connected with the gNB-CU-UP and the F1-C interface connected with the gNB-DU.

A gNB-CU-User Plane (gNB-CU-UP) comprises e.g., a logical node hosting e.g., the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU, e.g., according to 3GPP TS 38.401 V16.6.0 (2021-07) section 3.1 incorporated by reference.

Different functional splits between the central and distributed unit are possible, e.g., called options:

Option 1 (1A-like split):

The function split in this option is similar to the 1A architecture in DC. RRC is in the central unit. PDCP, RLC, MAC, physical layer and RF are in the distributed unit.

Option 2 (3C-like split):

The function split in this option is similar to the 3C architecture in DC. RRC and PDCP are in the central unit. RLC, MAC, physical layer and RF are in the distributed unit.

Option 3 (intra RLC split):

Low RLC (partial function of RLC), MAC, physical layer and RF are in the distributed unit. PDCP and high RLC (the other partial function of RLC) are in the central unit.

Option 4 (RLC-MAC split):

MAC, physical layer and RF are in the distributed unit. PDCP and RLC are in the central unit.

Or else, e.g., according to 3GPP TR 38.801 V14.0.0 (2017 March) section 11 incorporated by reference.

A gNB supports different protocol layers, e.g., Layer 1 (L1)—physical layer.

The layer 2 (L2) of NR is split into the following sublayers: Medium Access Control (MAC), Radio Link Control (RLC), Packet Data Convergence Protocol (PDCP) and Service Data Adaptation Protocol (SDAP), where e.g.:

The physical layer offers to the MAC sublayer transport channels;

The MAC sublayer offers to the RLC sublayer logical channels;

The RLC sublayer offers to the PDCP sublayer RLC channels;

The PDCP sublayer offers to the SDAP sublayer radio bearers;

The SDAP sublayer offers to 5GC QoS flows;

Comp. refers to header compression and Segm. To segmentation;

Control channels include (BCCH, PCCH).

Layer 3 (L3) includes e.g., Radio Resource Control (RRC), e.g., according to 3GPP TS 38.300 V16.6.0 (2021-06) section 6 incorporated by reference.

A RAN (Radio Access Network) node or network node like e.g. a gNB, base station, central node, distributed node, gNB CU or gNB DU or parts thereof may be implemented using e.g. an apparatus with at least one processor and/or at least one memory (with computer-readable instructions (computer program)) configured to support and/or provision and/or process CU and/or DU related functionality and/or features, and/or at least one protocol (sub-) layer of a RAN (Radio Access Network), e.g. layer 2 and/or layer 3. A central node may support central unit—control part (CU-CP) and/or central unit—user part (CU-UP) functionality. A distributed node may support distributed unit (DU) functionality.

A network node may be implemented as a master node or a secondary node, or acing as a master node or secondary node. A master node may at least include a central node and/or a distributed node. A secondary node may at least include a central node and/or a distributed node.

The gNB CU and gNB DU parts may e.g., be co-located or physically separated. The gNB DU may even be split further, e.g., into two parts, e.g., one including processing equipment and one including an antenna. A Central Unit (CU) may also be called BBU/REC/RCC/C-RAN/V-RAN, O-RAN, or part thereof. A Distributed Unit (DU) may also be called RRH/RRU/RE/RU, or part thereof. Hereinafter, in various example embodiments of the present disclosure, the CU-CP (or more generically, the CU) may also be referred to as a (first) network node that supports at least one of central unit control plane functionality or a layer 3 protocol of a radio access network; and similarly, the DU may be referred to as a (second) network node that supports at least one of distributed unit functionality or the layer 2 protocol of the radio access network.

A gNB-DU supports one or multiple cells, and could thus serve as e.g., a serving cell for a user equipment (UE).

A user equipment (UE) may include a wireless or mobile device, an apparatus with a radio interface to interact with a RAN (Radio Access Network), a smartphone, an in-vehicle apparatus, an IoT device, a M2M device, or else. Such UE or apparatus may comprise: at least one processor; and at least one memory including computer program code; wherein the at least one memory and the computer program code are configured to, with the at least one processor, cause the apparatus at least to perform certain operations, like e.g. RRC connection to the RAN. A UE is e.g., configured to generate a message (e.g., including a cell ID) to be transmitted via radio towards a RAN (e.g., to reach and communicate with a serving cell). A UE may generate and transmit and receive RRC messages containing one or more RRC PDUs (Packet Data Units).

The UE may have different states (e.g., according to 3GPP TS 38.331 V16.5.0 (2021 June) sections 42.1 and 4.4, incorporated by reference).

A UE is e.g., either in RRC_CONNECTED state or in RRC_INACTIVE state when an RRC connection has been established.

In RRC_CONNECTED state a UE may:

store the AS context;

transfer unicast data to/from the UE;

monitor control channels associated with the shared data channel to determine if data is scheduled for the data channel;

provide channel quality and feedback information;

perform neighboring cell measurements and measurement reporting.

The RRC protocol includes e.g. the following main functions:

RRC connection control;

measurement configuration and reporting;

establishment/modification/release of measurement configuration (e.g. intra-frequency, inter-frequency and inter-RAT measurements);

setup and release of measurement gaps;

measurement reporting.

The general functions and interconnections of the described elements and functions, which also depend on the actual network type, are known to those skilled in the art and described in corresponding specifications, so that a detailed description thereof may omitted herein for the sake of conciseness. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station/BS, a gNB, a radio network controller, a core network control element or function, such as a gateway element, or other network elements or functions, as described herein, and any other elements, functions or applications may be implemented by software, e.g., by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors. It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

According to Rel. 16, a Conditional PSCell Change (CPC) is defined as a Primary SCG Cell (PSCell) change that is executed by the UE when execution condition(s) is met. The UE starts evaluating the execution condition(s) upon receiving the CPC configuration, and stops evaluating the execution condition(s) once PSCell change is triggered.

FIG. 1 schematically illustrates an example of a signaling/messaging flowchart for MN-initiated inter-SN Conditional Primary SCG Cell Change according to 3GPP TS 37.340.

In step S101, MN (Master Node) suggests a list of PSCell(s) to be prepared by each potential Target SN by forwarding a measurement report containing the measurement results of the UE for the potential Target PSCells. Moreover, the MN indicates the maximum number of PSCells that can be prepared by each potential Target SN, i.e., up to 8 PSCells.

Therein, a potential Target SN refers to a Candidate SN configured in a candidate list comprising a plurality of Candidate SNs that are suitable for being configured for serving the UE. In the following, "potential Target SN" and "Candidate SN" are used interchangeably.

In step S102, the potential Target SNs decide on the potential Target PSCell(s) to be prepared among the cells in the suggested list. The potential Target SNs cannot select a PSCell that is not included in the list.

Therein, a potential Target PSCell refers to a Candidate PSCell configured in a candidate list comprising a plurality of Candidate PSCells that are suitable for being configured for serving the UE. In the following, "potential Target PSCell" and "Candidate PSCell" are used interchangeably.

In step S103, the MN sends, to the UE, Radio Resource Control (RRC) Reconfiguration message including the CPC configurations for the potential Target PSCells along with the CPC execution conditions, e.g., A4 or B1 measurement event according to TS 38.331. The UE confirms the reception of the reconfiguration in step S104.

In step S104a, upon receiving the RRC Reconfiguration Complete message from the UE, the MN informs a Source SN (Source Secondary Node) that CPC has been configured via Xn-U Address Indication procedure. The source SN, if applicable, starts early data forwarding towards a potential target SN. The forwarding of PDCP Protocol Data Unit (PDU) and/or PDCP Service Data Unit (SDU) may take place during early data forwarding.

After step S104, the UE evaluates the CPC conditions for the candidate PSCells. Once the CPC condition is met for a Candidate (potential Target) PSCell, the UE sets this candidate cell as the Target PSCell and executes CPC configuration (which comprises an updated MCG, that is, Master Cell Group configuration and Target SCG configuration) and sends RRC Reconfiguration Complete message in step S105 indicating to the MN and the Source SN the execution of the new MCG and SCG configurations, respectively.

In steps S106a-S106c, the MN triggers the MN-initiated SN release procedure to stop providing user data to the UE and triggers the Xn-U Address Indication procedure to inform the source SN the address of the selected Target SN and if applicable to start late data forwarding (in case early data forwarding is not triggered yet).

In step S107, the MN forwards to the Source SN the SN Reconfiguration Complete message that is received from the UE in step 105.

In step S108, the UE performs the Random Access Procure to the Target SN, if needed.

In steps S109a and S109b, the Source SN sends to the Target SN, via the MN, an SN (Sequence Number) Status Transfer message indicating the counter value of the packets that shall be sent to the UE in Downlink (DL) or to the User Plane Function (UPF) network node in UL.

In step S1010, the Source SN forwards the packets received from the UPF network node to the Target SN.

The remaining steps S1011 to S1017 are for switching the UPF path to the new Target SN and to release the UE context from the Source SN.

In the above procedure as illustrated in FIG. 1, the MN acts as an intermediate node that: (1) in step 109, transmits the SN (Sequence Number) Status Transfer message from the Source SN, i.e., the currently serving SN, to the Target SN, i.e., the newly selected Candidate SN to serve the UE; and (2) in step 1010, forwards data received from the UPF to the Target SN.

Due to those steps, the operations shown in FIG. 1 induce an unnecessary signalling burden in particular in a case of frequent data forwarding switch among the same Candidate SNs and increased Xn interface overhead since the MN would always have to relay the necessary configurations for the CPC as well as the data flows between the SNs and the UPF.

In view of these issues, the further enhancements for mobility work item (RP-213565) in Rel. 18 has the following objective: to specify mechanism and procedures of New Radio-Dual Connectivity (NR-DC) with selective activation of the cell groups (at least for SCG) via L3 enhancements, that is, to allow subsequent cell group change after changing cell group without reconfiguration and re-initiation of CPC/ CPA [RAN2, RAN3, RAN4].

Figure 2:
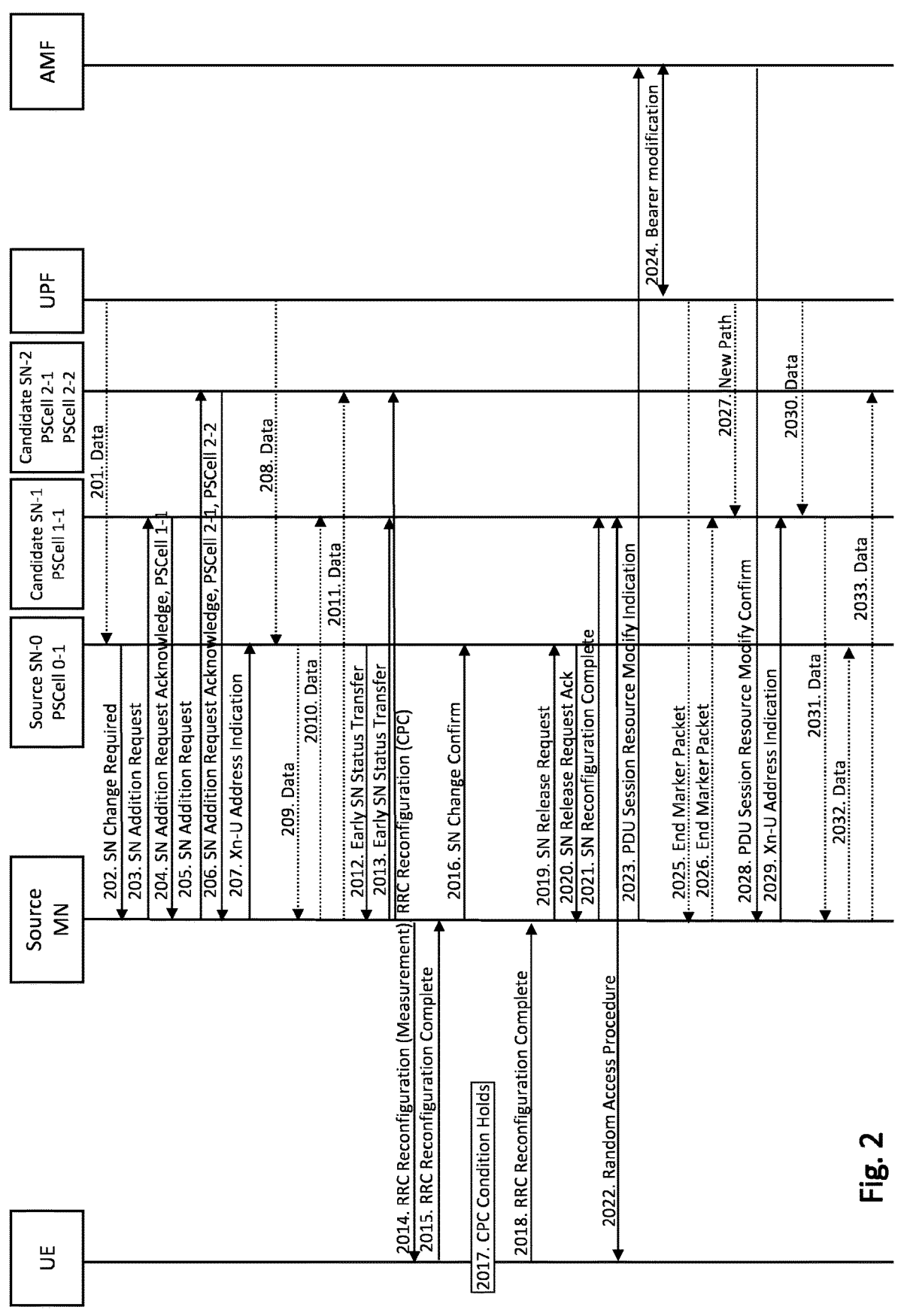
FIG. 2 schematically illustrates an example of a signaling/messaging flowchart for early data forwarding with selective activation of Secondary Cell Group.

FIG. 2 schematically illustrates an example of a signaling/ messaging flowchart for data forwarding with selective activation of Secondary Cell Group.

In the scenario of FIG. 2, the UE is already in dual connectivity with the Source SN-0. The N3 tunnel is setup between the UPF network node and the Source SN-0. Using measurements from the UE, the Source SN-0 determines that for instance a PSCell change is needed.

In step S201, the PDU session data is forwarded to the Source SN-0 from the UPF network node, wherein the Source SN-0 acts as the serving node for the PSCell 0-1 for the UE.

In step S202, the Source SN-0 sends an SN Change/ Addition Request message to the Source MN for a potential Conditional PSCell Change/Addition (CPC/CPA) (e.g., due to reduction of reference signal received power (RSRP) in the serving PSCell 0-1).

In steps S203 and S205, the Source MN respectively sends an SN Change/Addition Request message to the other Candidates SN-1 and SN-2.

In steps S204 and S206, the SN Change/Addition Request message is respectively acknowledged by the Candidate SN-1 for PSCell 1-1 and by Candidate SN-2 for PSCell 2-1 and PSCell 2-2, and CPC configurations are sent to the Source MN.

In step S207, the source MN sends the Xn-U Address Indication message to the Source SN-0 to indicate TEIDs for the Candidate SN-1 and the Candidate SN-2 and to start data forwarding.

Therein, the data forwarding carried out before execution of the CPC is preferably referred to as "early data forwarding" and may be necessary for applications with requirements of low latency.

In steps S208 to S2011, (early) data forwarding is executed, wherein the UPF network node sends data to the Source SN-0 which then forwards data to the Source MN.

Consequently, the Source MN forwards the data received from the UPF network node towards the Candidate SN-1 and the Candidate SN-2.

In step S2012, the Source SN-0 sends an Early SN (Sequence Number) Status Transfer message that indicates the last sequence number of the PDCP PDU packet sent towards the UE. The last sequence number is a sequence number of the last PDCP PDU packet sent to the UE while the UE is still served by the Source SN-0.

In steps S2013, the Early SN (Sequence Number) Status Transfer message is forwarded from the Source SN-0, via the source MN, to the Target SN-1, namely the Candidate SN-1 that is selected from all candidate SNs, to serve the UE.

Preferably, in step S2013, the Early Sequence Number Status Transfer message is transmitted to all Candidate SNs, namely the Candidate SN-1 and the Candidate SN-2. Thereby, it is indicated to the Target and/or Candidate SNs, which packets they can delete from their buffers as UE has already received these data.

In step S2014, the source MN sends an RRC Reconfiguration message comprising the CPC configurations and the related measurement configurations for the CPC execution condition to the UE.

In step S2015, the UE sends an RRC Reconfiguration Complete message to the Source MN acknowledging the above configurations for the CPC.

In step S2016, upon receiving the RRC Reconfiguration Complete message, the Source MN sends an SN Change Confirmation message to the Source SN-0.

In step S2017, after some time passes, the radio situation of the UE changes and the CPC execution condition for PSCell 1-1 holds.

In step S2018, the UE executes CPC for PSCell 1-1 that is controlled by the Target SN-1, and sends, to the Source MN, the RRC Reconfiguration Complete message comprising the SN RRC reconfigurations for the PSCell 1-1.

In steps S2019 to S2020, the Source MN sends an SN Release Request message to the Source SN-0, to indicate that UE is moving to another PSCell. The indication is acknowledged by the Source SN-0.

In step S2021, the Source MN sends an SN Reconfiguration Complete message to the Target SN-1 controlling the PSCell 1-1.

In step S2022, the UE completes the Random Access Procedure with the Target SN-1.

In step S2023, the Source MN sends to the AMF network node a PDU Session Resource Modify Indication message.

In step S2024, the AMF network node indicates to the UPF network node that the bearers are to be modified and the UPF network node acknowledges the change.

In step S2025, an End Marker Packet message is sent from the UPF network node to both the Source MN and the Source SN-0, marking an end to service of Source SN-0.

In step S2026, the End Marker Packet message is sent to the Target SN-1, i.e., the new serving SN, via the Source MN.

In step S2027, a new path for forwarding user data is established between the Target SN-1 and the UPF network node.

In step S2028, a PDU Session Resource Modify Confirm message is transmitted from the AMF network node to the Source MN, confirming the setup of the new path.

In step S2029, the Source MN sends the Xn-U Address Indication to the Target SN-1, i.e., the new serving SN, to indicate TEIDs for the candidate SNs and to start early data forwarding.

In steps S2030 to S2033, the Target SN-1, i.e., the new serving SN-1 starts early data forwarding to the erstwhile Source SN-0 (now a candidate SN with the SN-1 being the new serving SN) and the candidate SN-2 as potential handover candidates, wherein the data forwarding is carried out via the source MN.

In the above procedure provided in accordance with FIG. 2, after each PSCell change, the MN has to interact with the AMF that updates the path for data forwarding (steps S2023 to S2027), and the MN has to indicate/update the Candidate SN TEIDs to start data forwarding (steps S207 and S2029). These repeating update operations cause unnecessary signalling, especially if the serving PSCell is changed often.

Therefore, in order to overcome the issues with for instance the procedures shown for instance in FIG. 1 and FIG. 2, it is proposed in the present disclosure an apparatus/method for data forwarding for selective activation of SCG.

Therein, the present disclosure generally proposes to carry out data forwarding directly from the UPF network node to candidate SNs. In other words, the data packets are transmitted directly between the UPF network node and the candidate SNs. This method simplifies the data forwarding procedure and avoid unnecessary signaling after each SN change.

For achieving direct transmission of the data from the UPF network node to the candidate SNs, the additional paths towards the candidate SNs, to which the UPF network node should start early forwarding for e.g., SN initiated selective activation, are indicated to the UPF network node.

To be more specific, it is proposed in this disclosure that, for e.g., SN initiated selective activation, the Source SN indicates to the UPF network node the paths towards the candidate SNs to which the UPF network node should start early forwarding.

In one embodiment, the Source SN can use a GTP-C control message for indicating the paths to the UPF network node.

In another embodiment, the Source SN can indicate the Source MN to indicate the additional paths to the UPF network node. Therein, the Source MN may indicate the AMF network ndode to indicate the start of the data forwarding to the UPF network node. The indication of the MN to the AMF network node can be a PDU Session modification request. Alternatively or additionally, the Source MN indicates to the UPF network node a list of candidate SNs for selective activation. Using the indication, the UPF network node starts early data forwarding towards all candidate SNs.

Further, it is proposed in this disclosure that, for e.g., MN initiated selective activation, the MN indicates the same (the additional paths towards the candidate SNs) using e.g., GTP-C control message to UPF network node.

In one embodiment, the Source MN may indicate the AMF network node to indicate the start of the data forwarding to the UPF network node.

According to the above embodiments according to this disclosure, UPF obtains the additional paths towards the Candidate SNs, and accordingly executes early data forwarding, by sending data directly to the Source SN and all candidate SNs.

Further, when the UE executes the CPC, the UPF network node keeps sending data to the Target SN (that is, the candidate SN that has been selected as the new SN to serve the UE) and Candidate SNs, such that the new serving SN, i.e., the Target SN, forwards data to the UE as UE is served by the PSCell under the Target SN.

Preferably, the Source SN indicates the GTP-SN (GTP Sequence Number) to the Source MN along with the TEID of the related GTP session to the Source MN. Upon reception of this information, the Source MN can send a Sequence Number Status Transfer message to other potential/prepared Target SNs to indicate the Sequence Number of the next packet they shall communicate in DL to the UE. The Source MN is aware of the TEID from UPF towards each potential target SN (i.e., Candidate SN) and Source SN. The Source MN uses this mapping to indicate the PDU session specific GTP sequence number using the related TEID towards each target SN so the target SNs are aware of which packet they have to start transmitting once the UE arrives.

To summarize, with the method proposed in this disclosure, it is possible to forward the needed information, i.e., the paths towards the candidate SNs, directly to the UPF, which enables to execute data forwarding directly from the UPF to all candidate SNs. As a result, in case the SN changes frequently, unnecessary signaling can be avoided and latency is reduced.

Figure 3:
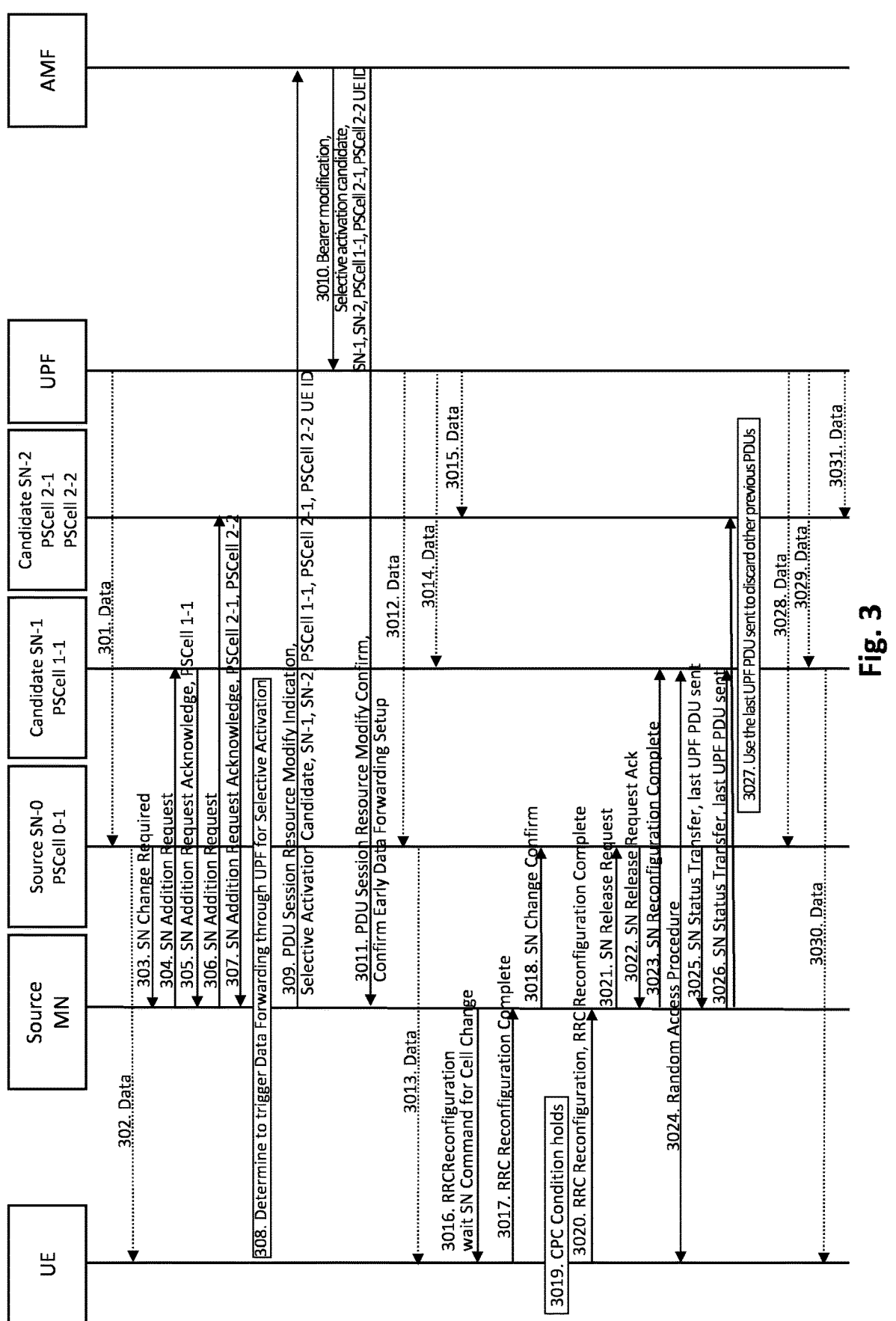
FIG. 3 schematically illustrates an example of a signaling/messaging flowchart for data forwarding for selective activation of Secondary Cell Group according to example embodiments of the present disclosure.

FIG. 3 schematically illustrates another example of a signaling/messaging flowchart for data forwarding for selective activation of Secondary Cell Group according to example embodiments of the present disclosure. Therein, it is proposed a solution with SN initiated CPC procedure.

In steps S301 and S302, the PDU session data is forwarded to the Source SN-0 from the UPF network node which acts as the serving node for the PSCell of the UE. The Source SN-0 transmit the data to the UE.

In step S303, the Source SN-0 sends a SN Change/Addition Request message to the Source MN for a potential Conditional PSCell Change/Addition (CPC/CPA) (e.g., due to reduction in serving PSCell RSRP).

In step S304, and analogously in step S306, the Source MN sends an SN Change/Addition Request message to the Candidate SN-1 and SN-2.

In step S305, and analogously in step S307, the SN Change/Addition Request message is acknowledged by the Candidate SN-1 for the Candidate PSCell 1-1 and by the Candidate SN-2 for the Candidate PSCell 2-1 and PSCell 2-2, and CPC configurations are sent to the Source MN.

In step S308, the Source MN determines that early data forwarding is to be triggered over UPF. More specifically, the Source MN determines that after selective activation is configured, some PDU Sessions of the UE require low latency.

In step S309, the Source MN sends a PDU Session Resource Modification Indication message to the AMF network node to indicate to start early data forwarding to Candidate PSCells. Preferably, the PDU Session Resource Modification Indication message comprises the list of candidate PSCells and Candidate SNs.

In step S3010, the AMF network node indicates to the UPF network node that the early data forwarding is to be started towards the selective activation candidate cells, and indicates to the UPF network node the Candidate PSCells and Candidate SNs along with the UE identifier.

In step S3011, after the tunnels for the PDU Session towards the Candidates SNs are established, the AMF network node sends a PDU Session Resource Modification Confirmation message for confirming, towards the source MN, the early data forwarding setup. Preferably, the AMF network node indicates the TEIDs indicated in the GTP-U header of each PDU Session related to each SN, including the Source SN and the Candidate SNs.

In steps S3012 to S3015, early data forwarding is executed, wherein the UPF network node sends data to the Source SN-0, the candidate SN-1 and the candidate SN-2. The Source SN-0 further forwards data to the UE.

In step S3016, the Source MN sends to the UE an RRC Reconfiguration message containing the CPC configurations and the related measurement configurations for the CPC execution condition.

In step S3017, the UE sends an RRC Reconfiguration Complete message to the Source MN acknowledging the configuration.

In step S3018, upon receiving the RRC Reconfiguration Complete message, the Source MN sends an SN Change Confirm message to the Source SN-0.

In step S3019, after some time passes, the radio situation of the UE changes and the CPC execution condition for PSCell 1-1 holds.

In step S3020, the UE executes CPC for PSCell 1-1 and sends the RRC Reconfiguration Complete message to the Source MN, wherein the RRC Reconfiguration Complete message comprises the SN RRC reconfigurations for PSCell 1-1.

In steps S3021 and S3022, the Source MN sends an SN Release Request message to the Source SN-0, to indicate that UE is moving to another PSCell, i.e., the PSCell 1-1. The indication is acknowledged by the Source SN.

In step S3023, the Source MN sends an SN Reconfiguration Complete message to the Candidate SN 1 controlling the PSCell 1-1.

In step S3024, the UE completes the Random Access Procedure with the Target SN-1, that is, the candidate SN-1 selected as the new SN to serve the UE.

In step S3025, the Source SN-0 sends, to the source MN, a PDU Sequence Number Status Transfer message that indicates the last sequence number of the PDU session packet sent towards the UE. Therein, the last sequence number is the sequence number of the PDU session packet that is last sent towards the UE while the Source SN-0 is serving the UE. In other words, the last sequence number is the sequence number of the PDU session packet that is last sent towards the UE before the UE moves to a Target PSCell that is selected from the candidate PSCells to serve the UE. Preferably, the Source SN-0 indicates to the source MN the TEID comprised in the GTP-U header of the related PDU session.

In step S3026, the source MN maps the TEID of the PDU session, for which the last UPF PDU Session sequence number is received, to the TEID of the Target SN. The Source MN indicates the UPF PDU Session sequence number, along with the TEID used by the Target SN.

Preferably, in step S3026, the Early Sequence Number Status Transfer message is transmitted to all Candidate SNs, namely the Candidate SN-1 and the Candidate SN-2. Thereby, it is indicated to the Target and/or Candidate SNs, which packets they can delete from their buffers as UE has already received these data.

In step S3027, the Target SN-1 uses the last sequence number to discard the PDU session packets that have a lower sequence number compared to the received last sequence number of the PDU session and start forwarding the remaining packets of the PDU Session.

In steps S3028 to S3031, the UPF keeps sending data to the SN-0 (now a candidate SN after CPC), SN-1 (now the serving SN after CPC) and SN-2 (still a candidate SN). The source SN-1 forwards data to the UE as UE is served by PSCell 1-1 under SN-1.

To summarize, in the embodiment proposed as shown in FIG. 7, the MN determines to trigger data forwarding, and indicates to the UPF, via the AMF, the TEIDs for transmitting the PDU packets of each SN (steps S308 to S3010). Consequently, the UPF directly receives the necessary information for forwarding data to each SN, and can immediately execute data forwarding to all SNs. This is advantageous in particular for applications that require a low latency such that early data forwarding can be carried out from the UPF directly to each SN, without the MN having to act between the SNs and UPF. This reduces signalling overhead to MN.

Further, in Steps S3025 and S3026, the Source SN indicates the GTP-Sequence Number to the source MN along with the TEID of the related GTP PDU session. Upon reception of this information, the MN sends Sequence Number Status Transfer message to prepared Target SNs to indicate the Sequence Number of the next packet they shall communicate in DL to the UE. Source MN is aware of the TEID from UPF towards each target SN and source SN. Source MN uses this mapping to indicate the PDU session specific GTP sequence number using the related TEID towards each target SN so that the target SNs are aware of which packet they have to start transmitting once the UE arrives. This ensures a lower latency in transmission of data.

Figure 4:
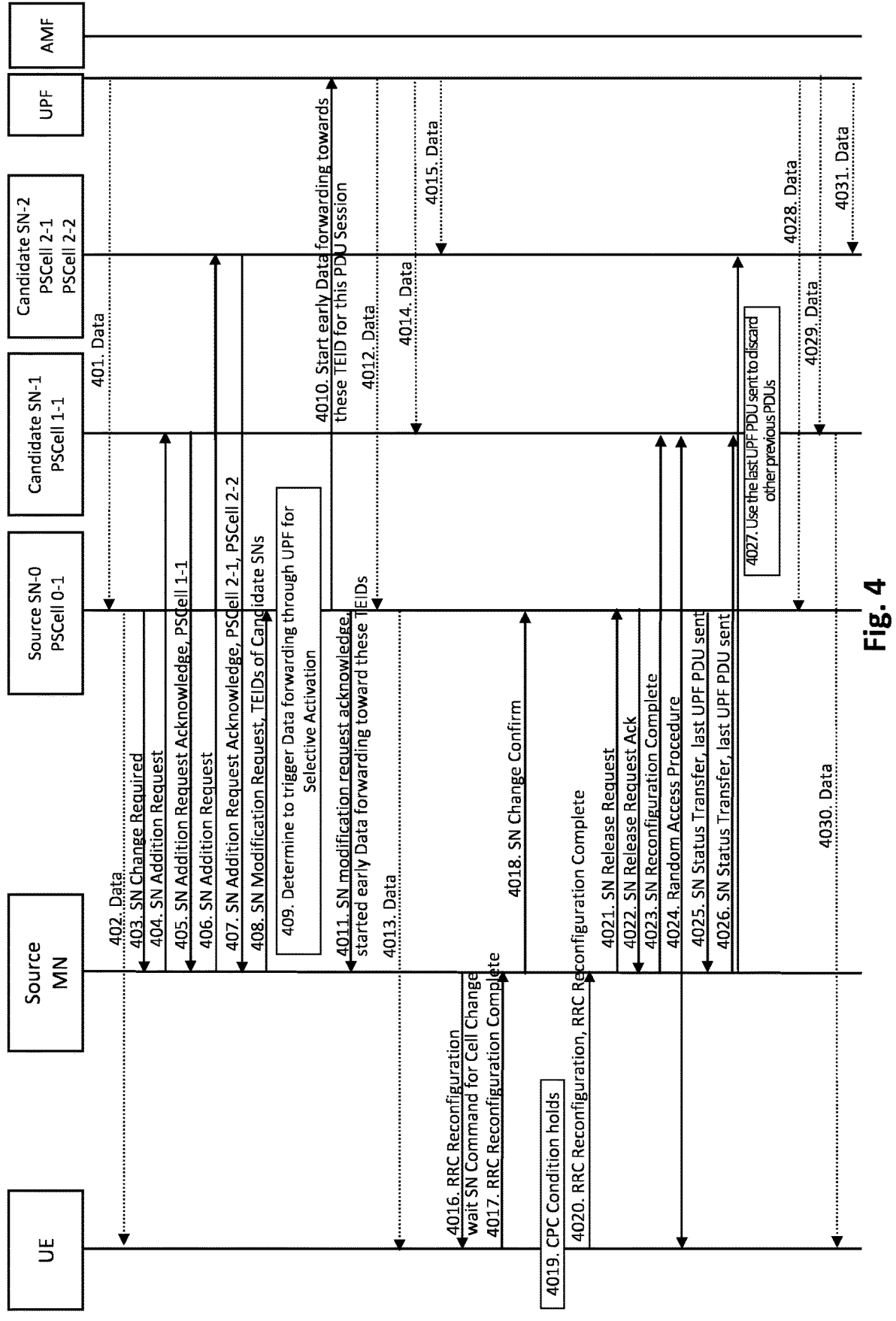
FIG. 4 schematically illustrates another example of a signaling/messaging flowchart for data forwarding for selective activation of Secondary Cell Group according to example embodiments of the present disclosure.

FIG. 4 schematically illustrates another example of a signaling/messaging flowchart for data forwarding for selective activation of Secondary Cell Group according to example embodiments of the present disclosure. Therein, it is proposed a solution with direct UPF indication over Source SN.

The procedure shown in FIG. 4 is similar to that shown in FIG. 3, with steps S301-S307 and S3012-S3031 being the same as steps S401-S407 and S4012-S4031, and with the following differences in steps S408-S4011 compared with steps S308-S3011.

In step S408, the Source MN sends, to the Source SN-0, i.e., the serving SN, a SN Modification Request message, preferably indicating TEIDs towards the Candidate SNs.

In step S409, the Source SN-0 determines to trigger data forwarding through UPF for selective activation.

In step S4010, the Source SN-0 sends to the UPF network node an indication message for starting early data forwarding, preferably towards the TEIDs indicated in the SN Modification Request message. Thereby, the UPF is informed, for each Candidate SN, for which PDU session is data to be forwarded to the SNs.

In step S4011, the Source SN-0 sends to the Source MN an SN Modification Request Acknowledge message, preferably indicating to the Source MN that early data forwarding has been started towards the TEIDs that the Source MN has sent to the Source SN-0.

To summarize, while FIG. 3 provides that the TEIDs towards the SNs are indicated to the UPF from the Source MN (possible via the AMF network node), FIG. 4 provides that the Source SN (possibly by receiving the TEIDs from the MN) indicates to the UPF the TEIDs.

In both cases, it is provided in this disclosure that the UPF network node directly receives the PDU session related information for each SN for forwarding data to the SNs. This leads to reduced latency as the data is directly forwarded to each SN.

Finally, it is nevertheless to be noted that, although in the above-illustrated example embodiments (with reference to the figures), the messages communicated/exchanged between the network components/elements may appear to have specific/explicit names, depending on various implementations (e.g., the underlining technologies), these messages may have different names and/or be communicated/exchanged in different forms/formats, as can be understood and appreciated by the skilled person.

According to some example embodiments, there are also provided corresponding methods suitable to be carried out by the apparatuses (network elements/components) as described above, such as the UE, source MN, source SN, target SN, UPF, and AMF etc.

It should also be noted that the apparatus (device) features described above correspond to respective method features that may however not be explicitly described, for reasons of conciseness. The disclosure of the present document is considered to extend also to such method features. In particular, the present disclosure is understood to relate to methods of operating the devices described above, and/or to providing and/or arranging respective elements of these devices.

Further, according to some further example embodiments, there is also provided a respective apparatus (e.g., implementing the UE, source MN, target MN, target SN, etc., as described above) that comprises at least one processing circuitry, and at least one memory for storing instructions to be executed by the processing circuitry, wherein the at least one memory and the instructions are configured to, with the at least one processing circuitry, cause the respective apparatus to at least perform the respective steps as described above.

Yet in some other example embodiments, there is provided a respective apparatus (e.g., implementing the UE, source MN, source SN, target SN, etc., as described above) that comprises respective means configured to at least perform the respective steps as described above.

It is to be noted that examples of embodiments of the disclosure are applicable to various different network configurations. In other words, the examples shown in the above described figures, which are used as a basis for the above discussed examples, are only illustrative and do not limit the present disclosure in any way. That is, additional further existing and proposed new functionalities available in a corresponding operating environment may be used in connection with examples of embodiments of the disclosure based on the principles defined.

It should also be noted that the disclosed example embodiments can be implemented in many ways using hardware and/or software configurations. For example, the disclosed embodiments may be implemented using dedicated hardware and/or hardware in association with software executable thereon. The components and/or elements in the figures are examples only and do not limit the scope of use or functionality of any hardware, software in combination with hardware, firmware, embedded logic component, or a combination of two or more such components implementing particular embodiments of the present disclosure.

It should further be noted that the description and drawings merely illustrate the principles of the present disclosure. Those skilled in the art will be able to implement various arrangements that, although not explicitly described or shown herein, embody the principles of the present disclosure and are included within its spirit and scope. Furthermore, all examples and embodiment outlined in the present disclosure are principally intended expressly to be only for explanatory purposes to help the reader in understanding the principles of the proposed method. Furthermore, all statements herein providing principles, aspects, and embodiments of the present disclosure, as well as specific examples thereof, are intended to encompass equivalents thereof.

The invention claimed is:

1. A User Plane Function (UPF) network node, configured for data forwarding for selective activation of a Secondary Cell Group (SCG) for serving a User Equipment (UE) the UPF network node comprising:
   at least one processor, and at least one memory storing instructions that, when executed by the at least one processor, cause the UPF network node at least to:
      receive an indication message for starting data forwarding; and
      execute data forwarding on the basis of the received indication message,
      wherein the indication message indicates, for selective activation of a Target Primary SCG Cell (Target PSCell), for serving the UE, a candidate list comprising Candidate PSCells and Candidate Secondary Nodes (Candidate SNs), wherein the indication message further indicates a Source Secondary Node (Source SN) and the UPF network node is further caused to:
   execute data forwarding directly towards the Candidate SNs and the Source SN.

2. The UPF network node according to claim 1, wherein the indication message indicates, for each SN of the candidate list, a Protocol Data Unit, (PDU) session related to the each SN.

3. The UPF network node according to claim 1, wherein the UPF network node is caused to execute data forwarding before the UE moves to a Candidate PSCell that is selected from the candidate list as the Target PSCell.

4. The UPF network node according to claim 1, wherein the UPF network note is caused to transmit a confirmation message for starting data forwarding, wherein the confirmation message comprises, for each SN of the candidate list, a Tunnel Endpoint Identity (TEID) of a GPRS Tunnelling Protocol (GTP) tunnel established for transmitting Protocol Data Unit (PDU) session packets related to the each SN.

5. The UPF network node according to claim 1, wherein the UPF network node is caused to execute data forwarding after the UE moves to a Candidate PSCell that is selected from the candidate list as the Target PSCell.

6. A Source Master Node (Source MN) configured for data forwarding for selective activation of a Secondary Cell Group (SCG) for serving a User Equipment (UE) the Source MN node comprising:
   at least one processor, and
   at least one memory storing instructions that, when executed by the at least one processor, cause the Source MN at least to:
      transmit, to a User Plane Function (UPF) network node, an indication message for starting data forwarding, wherein the indication message indicates, for selective activation of a Target Primary SCG Cells (Target PSCell) for serving the UE, a candidate list comprising Candidate PSCells and Candidate Secondary Nodes (Candidate SNs), wherein the indication message further indicates a Source Secondary Node (Source SN).

7. The Source MN according to claim 6, wherein the indication message indicates, for each SN of the candidate list, a Protocol Data Unit (PDU) session related to the each SN.

8. The Source MN according to claim 6, wherein the Source MN is further caused to:
   transmit a Sequence Number Status message to a Candidate SN that is selected from the candidate list as the Target SN for serving the UE, the Sequence Number Status message indicating a last sequence number of the last Protocol Data Unit, PDU session packet sent towards the UE before the UE moves to the Target PSCell.

9. The Source MN according to claim 8, wherein the Sequence Number Status message comprises a Tunnel Endpoint Identity (TEID) of a GPRS Tunneling Protocol (GTP) tunnel established for a corresponding PDU session, for which the last PDU Session packet with the last sequence number is received, and the Source MN is further caused to:

map the TEID of the GTP tunnel for the corresponding PDU session to a TEID of the Target SN.

10. The Source MN according to claim 6, wherein the Source MN is caused to transmit the indication message for starting data forwarding to the UPF network node via an Access and Mobility Management Function (AMF) network node.

11. The Source MN according to claim 6, wherein the Source MN is further caused to: before sending the indication message and on the basis of latency requirements of the UE, determine that data forwarding is to be carried out.

12. A Source Secondary Node (Source SN) configured for data forwarding for selective activation of a Secondary Cell Group (SCG) for serving a User Equipment (UE) the Source SN comprising:

at least one processor, and at least one memory storing instructions that, when executed by the at least one processor, cause the Source SN at least to:

transmit, to a User Plane Function (UPF) network element, an indication message for starting data forwarding, wherein the indication message indicates, for selective activation of a Target Primary SCG Cells (Target PSCell) for serving the UE, a candidate list comprising Candidate PSCells and Candidate Secondary Nodes (Candidate SNs) wherein the indication message further indicates the Source SN.

13. The Source SN according to claim 12, wherein the indication message indicates, for each SN of the candidate list, a Protocol Data Unit (PDU) session related to the each SN.

14. The Source SN according to claim 12, wherein the Source SN is further caused to:

transmit, to the Source MN, a Sequence Number Status message indicating a last sequence number of the PDU session packet sent towards the UE before the UE moves to the Target PSCell.

15. The Source SN according to claim 12, wherein the Source SN is further caused to: before sending the indication message and on the basis of latency requirements of the UE, determine that data forwarding is to be carried out.

* * * * *